United States Patent
Date et al.

[11] Patent Number: 5,959,677
[45] Date of Patent: Sep. 28, 1999

[54] DIGITAL DATA TRANSMISSION SYSTEM

[75] Inventors: Akira Date, Kunitachi; Taizo Kinoshita, Tachikawa, both of Japan

[73] Assignee: Hitachi, Ltd., Japan

[21] Appl. No.: 08/989,783

[22] Filed: Dec. 12, 1997

[30] Foreign Application Priority Data

Dec. 13, 1996 [JP] Japan .................................. 8-333379

[51] Int. Cl.[6] .............................. H04N 7/04; H04N 7/08
[52] U.S. Cl. ......................... 348/423; 348/385; 370/538
[58] Field of Search ................................. 348/385, 388, 348/423, 10, 13–17, 21, 461–462, 467–468, 473–475; 370/537–541; H04N 7/04, 7/08

[56] References Cited

U.S. PATENT DOCUMENTS

| | | | |
|---|---|---|---|
| 5,216,503 | 6/1993 | Paik et al. | 348/385 |
| 5,301,191 | 4/1994 | Otani | 370/468 |
| 5,550,589 | 8/1996 | Shiojiri et al. | 348/385 |
| 5,550,590 | 8/1996 | Sakazawa et al. | 348/385 |
| 5,612,742 | 3/1997 | Krause et al. | 348/385 |
| 5,671,226 | 9/1997 | Murakami et al. | 370/474 |
| 5,712,850 | 1/1998 | Elia et al. | 348/385 |
| 5,805,220 | 9/1998 | Keesman et al. | 348/385 |
| 5,815,502 | 9/1998 | Saito et al. | 370/468 |
| 5,861,919 | 1/1999 | Perkins et al. | 348/385 |
| 5,877,812 | 3/1999 | Krause et al. | 348/385 |

*Primary Examiner*—Vu Le
*Attorney, Agent, or Firm*—Sofer & Haroun, LLP

[57] ABSTRACT

In a digital data transmission system of the present invention, the total transmission rate which changes with the passage of time in a plurality of video/audio signals multiplexed with a plurality of digital data on a transmission path is monitored without allocation of individual transmission rates to the plurality of video/audio signals so that encoders are controlled only when the total transmission rate exceeds the maximum transmission rate. Further, the plurality of digital data are transmitted within a range of the residual transmission rate obtained by subtracting the total transmission rate of the plurality of video/audio signals from the maximum transmission rate in the transmission path, whereby real-time transmission of video/audio signals and transmission of digital data can be made consistent with each other on one transmission path without reduction in video/audio quality of the transmitted video/audio signals.

14 Claims, 5 Drawing Sheets

DIGITAL DATA TRANSMISSION SYSTEM

BACKGROUND OF THE INVENTION

1. Field of the Invention

The present invention relates to a system not only for performing real-time transmission of animation pictures, audio data, or the like, but also for transmitting/receiving digital data such as computer information, character data, or the like, in satellite broadcasting.

2. Description of the Related Art

In conventional television broadcasting, mainly transmission of video/audio signals has been made. Television broadcasting, however, has been diversified for the purposes of: delivery of information related to television programs (such as introduction of persons appearing on television programs, detailed description of commercial goods introduced on television programs, and questionnaire survey for audiences concerning the contents of television programs); and distribution of digital data such as computer programs, etc.

Digital data broadcasting at present is classified into a transmission system using ground wave (terrestrial broadcasting) and a transmission system using a satellite (satellite broadcasting). In the terrestrial broadcasting, data are multiplexed in a vertical blanking internal so that digital data are transmitted at a transmission rate of about 40 kbps. In the system in which transmission is carried out by using a satellite, digital data can be transmitted at a transmission rate of 1088 kbps.

At present, teletext broadcasting is made in the terrestrial broadcasting. The teletext broadcasting may be said to be a kind of data broadcasting because digital data are transmitted in the form of packets. In the teletext broadcasting, character data are transmitted after they are superposed in a vertical blanking interval The character data to be superposed are two-valued NRZ codes. Accordingly, the capacity of data in one horizontal scanning interval is 296 bits, so that the transmission rate is about 16 kbps per one horizontal scanning interval.

On the other hand, in the satellite broadcasting, audio signals are digitized and transmitted with an audio subcarrier of 5.727272 MHz modulated by four-differential-phase shift keying. An audio signal transmission system in the satellite broadcasting is shown in FIG. 7.

The transmission system shown in FIG. 7 has an A-mode in which audio signals are quantized linearly into a width of 14 bits by a sampling frequency of 32 kHz in an A/D portion and further compressed to a width of 10 bits, and a B-mode in which audio signals are quantized linearly into a width of 16 bits by a sampling frequency of 48 kHz.

In the A-mode, four-channel audio signals 650, 651, 652 and 653 are multiplexed by a multiplexing portion 281 and then transmitted. In the B-mode, two-channel audio signals 650 and 651 are multiplexed by the multiplexing portion 281 and then transmitted. The multiplex signal is modulated by a digital modulation portion 282, combined with a video signal 654 by a synthesizing portion 283 and transmitted to a satellite from a modulation portion 284. In the receiver side, the received signal is demodulated by a demodulation portion 285 and separated into a video signal 659 and an audio signal 660 by a separating portion 286. The audio signal 660 is demodulated by a digital demodulation portion 287 and separated into respective-channel audio signals by a separating portion 288. The respective-channel audio signals are converted into analog signals by a D/A conversion portion 289. In the A-mode, audio signals 655, 656, 657, 658 and 659 are output. In the B-mode, audio signals 655 and 656 are output. In the B-mode, high-quality audio signals can be transmitted though the number of channels is smaller than the number of channels in the A-mode.

Further, in the digital channels, digital data can be transmitted independent of the audio signals. From a frame configuration diagram, a one-frame independent digital data portion has 480 bits in the A-mode and has 224 bits in the B-mode.

Because such frames are transmitted at intervals of 1 ms, digital signals containing audio signals are transmitted at a transmission rate of 2048 kbps. The transmission of digital data is achieved when this independent digital data portion and free bits not used for transmission of audio signals are allocated to the transmission of digital data. For example, in the case of A-mode stereo without loaded audio signal, the rate of transmission of digital data is 1120 kbps (1088 kbps if management information is excluded).

SUMMARY OF THE INVENTION

When a plurality of video/audio signals and a plurality of digital data are multiplexed and transmitted in the conventional systems, allowable transmission rates must be allocated to channels for the video/audio signals and to channels for the digital data in advance so that the allowable transmission rates do not exceed a maximum transmission rate in a transmission path. That is, coded signals obtained by encoding the video/audio signals and the digital data can be only transmitted within the transmission rates allocated in advance. Further, allowable transmission rates are allocated to the transmission of video/audio signals in advance in the same manner as the transmission of digital data though the quantities of information generated in encoders change with the passage of time correspondingly to the change of the contents of the video/audio signals. Accordingly, video/audio signals must be transmitted with reduction in video/audio quality because of real-time transmission within the allocated transmission rate range.

An object of the present invention is to provide a digital data transmission system in which real-time transmission of video/audio signals and transmission of digital data can be performed on one transmission path without reduction in video/audio quality of the transmitted video/audio signals.

Another object of the present invention is to provide a transmitter in which maximum transmission rates in a plurality of transmission paths are used effectively for real-time transmission of video/audio signals and transmission of digital data so that real-time transmission of the video/audio signals can be made without reduction in video/audio quality.

In the digital data transmission system according to the present invention, the total transmission rate which changes with the passage of time in a plurality of video/audio signals multiplexed with a plurality of digital data on a transmission path is monitored without allocation of individual transmission rates to the plurality of video/audio signals so that encoders are controlled only when the total transmission rate exceeds the maximum transmission rate in the transmission path. Further, the plurality of digital data are transmitted within a range of the residual transmission rate which is obtained by subtracting the total transmission rate in the plurality of video/audio signals from the maximum transmission rate in the transmission path.

Specifically, a transmitter in the digital data transmission system includes transmission rate measuring portions, and a transmission rate evaluation control portion. The transmission rate measuring portions measure transmission rates in coded signals obtained by encoding the video/audio signals and inform the transmission rate evaluation control portion of the transmission rates. The transmission rate evaluation control portion calculates the sum Ra of the transmission rates given from the plurality of transmission rate measuring portions and compares the sum Ra with the maximum transmission rate Rm in the transmission path. In the case of Ra≧Rm, the transmission rate evaluation control portion supplies control signals to the encoders so as to suppress the quantities of information generated in the encoders. In the case of Ra<Rm, the transmission rate evaluation control portion calculates the difference Rd between the maximum transmission rate Rm in the transmission path and the sum Ra of the respective transmission rates and controls the transmission rate for the digital data on the basis of the difference Rd.

According to another aspect of the present invention, a transmitter for transmitting a plurality of multiplex signals each containing a plurality of digital data and a plurality of video/audio signals on a plurality of transmission paths formed between the transmitter and a satellite includes a distributer which is connected to a plurality of encoders and to a plurality of multiplexers. In the distributer, transmission rates in the respective coded signals from the plurality of encoders are monitored so that the input coded signals are distributed to the plurality of multiplexers on the basis of the transmission rates in the respective coded signals and the maximum transmission rates in the respective transmission paths.

DESCRIPTION OF THE PREFERRED EMBODIMENTS

Embodiments of the present invention will be described below with reference to the drawings.

Figure 4:
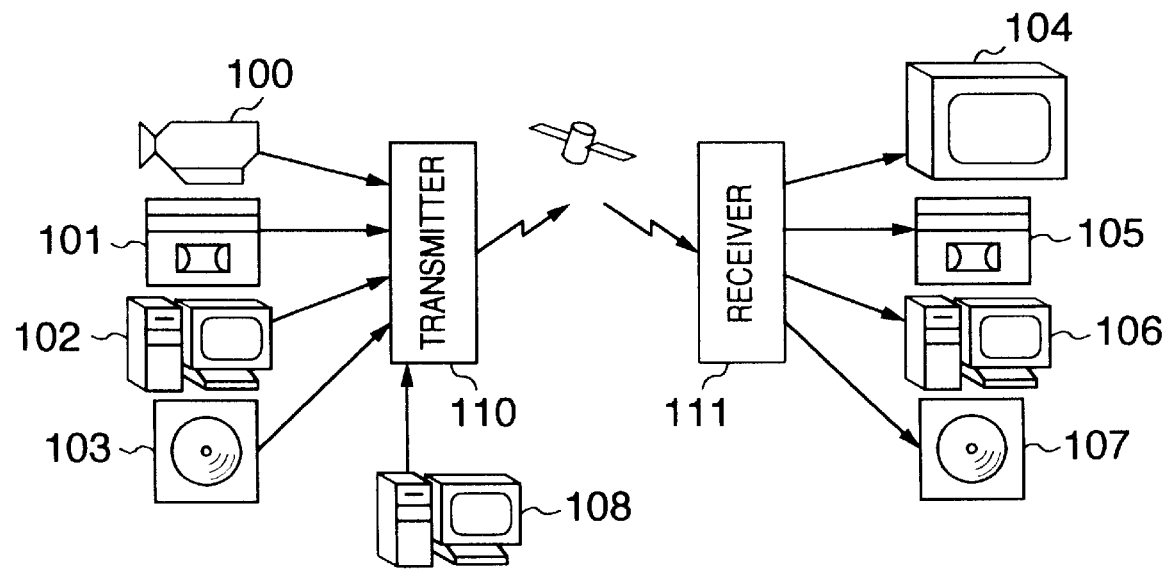
FIG. 4 is a schematic diagram of a digital data transmission system.

FIG. 4 is a schematic diagram of a digital data transmission system according to the present invention. Like the conventional system, this system performs transmission of digital data such as computer programs, computer data, or the like, as well as real-time transmission of video and audio signals.

A transmitter 110 is supplied with video and audio data taken by a camera 100, video and audio data recorded by a VTR 101, video and audio data generated by a computer 102, video and audio data recorded in a package medium 103 and digital data generated by a computer 108. These input signals are multiplexed, modulated and transmitted to a satellite by the transmitter 110.

On the other hand, a receiver 111 demodulates a signal received from the satellite and separates the signal into channels. Some of the separate signals is displayed on a display device 104 such as a television set, some is recorded by a VTR 105 or in a package medium 107 and some is used as input data given to a computer 106.

Figure 2:
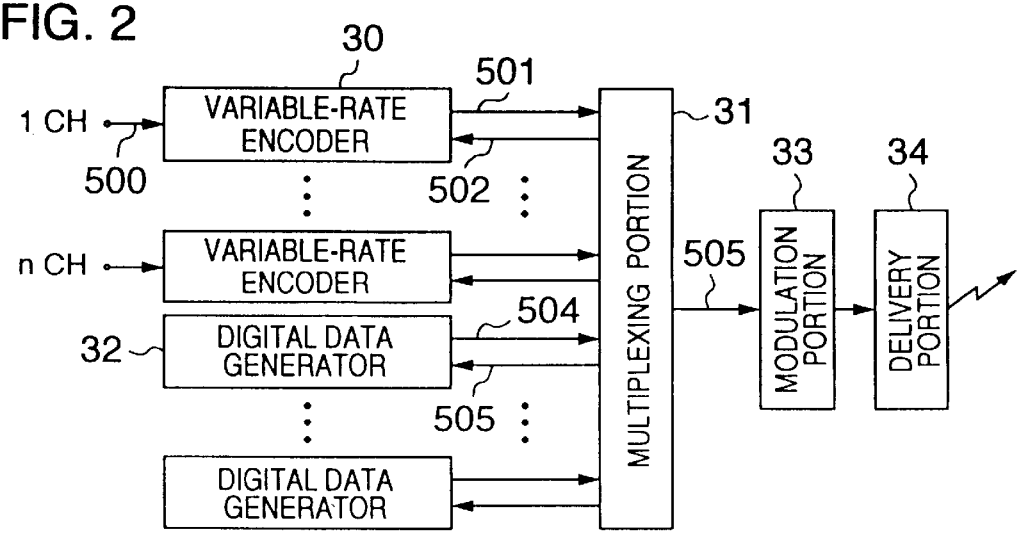
FIG. 2 is a block diagram of a transmitter.

FIG. 2 is a block diagram of the transmitter 110. The transmitter 110 includes variable-rate encoders 30 for encoding video and audio signals in real time at a variable rate, digital data generators 32 for generating digital data to be transmitted in non-real time, a multiplexing portion 31 for multiplexing coded signals given from the variable-rate encoders 30 and digital data given from the digital data generators 32 and controlling the quantity of information generated in the variable-rate encoders 32 and the digital data generators 32, a modulation portion 33 for modulating the multiplex signal, and a delivery portion 34 for radiating the modulated signal into air.

A video/audio signal 500 input to a certain channel (for example, channel #1) is compressed and coded by a variable-rate encoder 30. The coded signal 501 is input to the multiplexing portion 31. With respect to other channels (for example, channel #N), coded signals are input to the multiplexing portion 31 in the same manner as described above. Further, digital data 504 generated by the digital data generators 32 are input to the multiplexing portion 31.

Incidentally, the quantity of information in the coded signals 501 input to the multiplexing portion 31, that is, the quantity of information generated in the variable-rate encoders 30 changes with the passage of time correspondingly to the content of the coded video/audio data.

The multiplexing portion 31 multiplexes the coded signals 501 given from the variable-rate encoders 30 and the digital data 504 given from the digital data generators to thereby output a multiplex signal. Incidentally, the multiplexing portion 31 supplies control signals 502 to the variable-rate encoders 30 to control the quantity of information generated in the variable-rate encoders 30. Further, the multiplexing portion 31 supplies control signals 505 to the digital data generators 32 to control the quantity of information generated in the digital data generators 32.

The multiplex signal 506 from the multiplexing portion 31 is digitally modulated by the modulation portion 33 and then transmitted to the satellite by the delivery portion 34.

Figure 3:
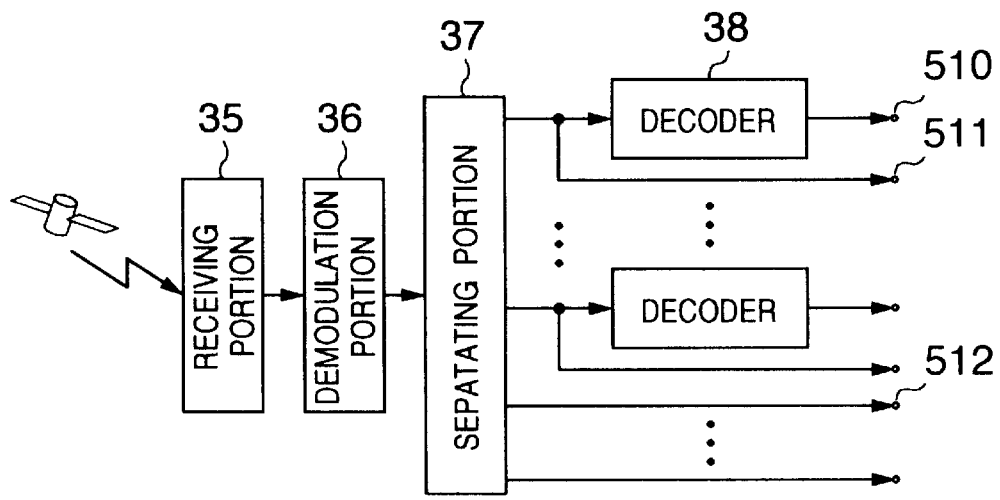
FIG. 3 is a block diagram of a receiver.

FIG. 3 is a block diagram of the receiver 111. The multiplex signal from the satellite is received by a receiving portion 35 and demodulated by a demodulation portion 36. Further, the multiplex signal is separated into channels by a separating portion 37, that is, the multiplex signal is separated into coded signals and digital data 512 allocated to channels respectively. The coded signals from the separating portion 37 are decoded by decoders 38, so that video/audio signals 510 are output. Further, the receiver 111 is provided with terminals 511 so that the coded signals are directly output from the terminals 511. Apparatuses (such as a digital VTR, a DVD, a computer, etc.) receiving the coded video/audio signals as input signals can be connected to the terminals 511.

Figure 1:
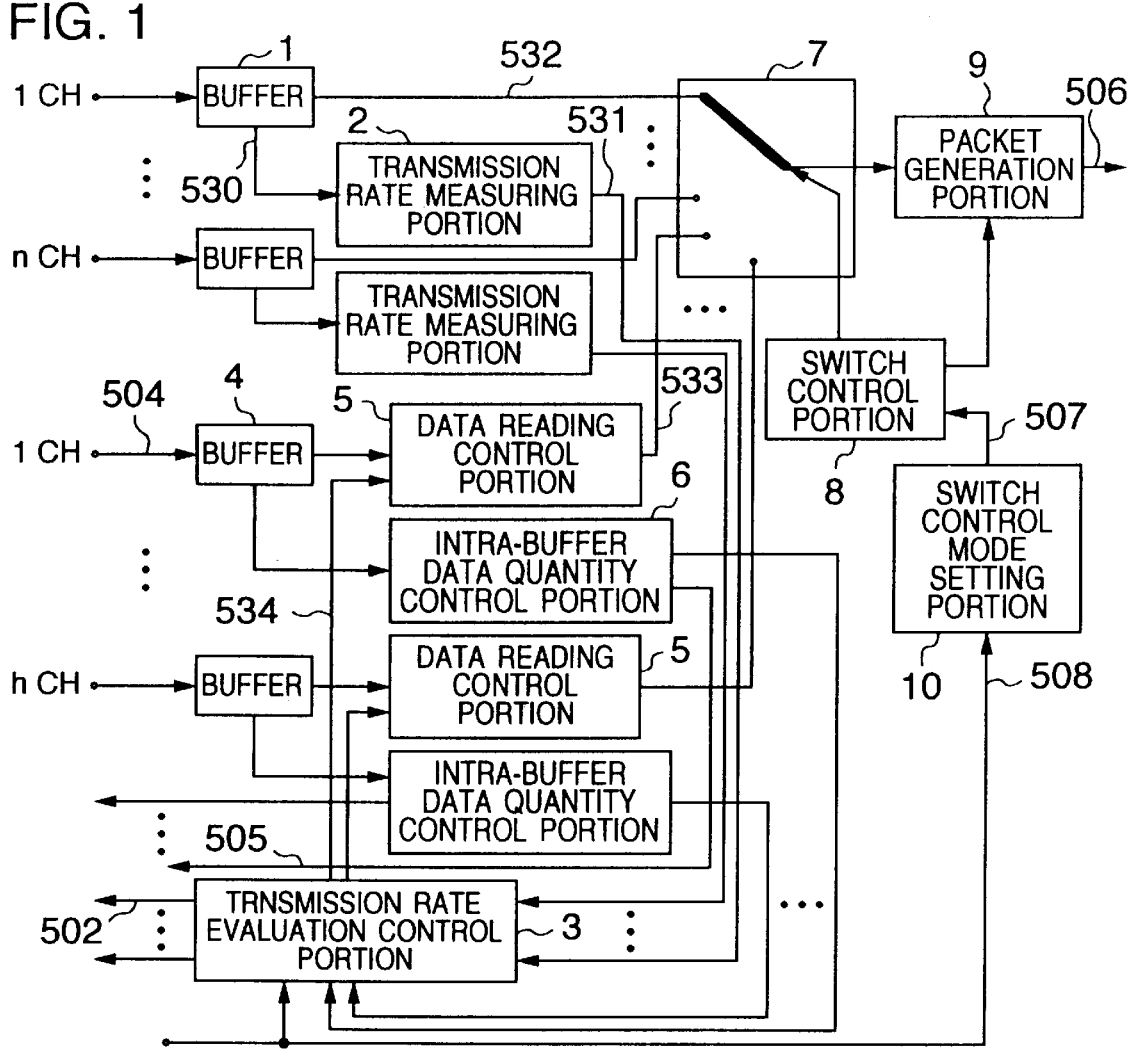
FIG. 1 is a block diagram of a multiplexing portion.

FIG. 1 is a block diagram of the multiplexing portion 31. The multiplexing portion 31 has buffers 1 and 4, transmission rate measuring portions 2, a transmission rate evaluation control portion 3, data reading control portions 5, in-buffer data quantity control portions 6, a switch 7, a switch control portion 8, a packet generating portion 9, and a switch control mode setting portion 10.

In FIG. 1, the multiplexing portion 32 is designed so that n variable-rate encoders 30 and h digital data generators 32 can be connected to the multiplexing portion 32. The coded signals given from the n variable-rate encoders respectively are temporarily stored in the buffers 1 which are provided so as to be allocated to the channels (channel #1 to channel #n).

The buffers 1 monitor the quantities of information in the input coded signals so that the quantities 530 of information generated in the variable-rate encoders 30 are given to the transmission rate measuring portions 2 which are provided so as to be allocated to the channels (channel #1 to channel #n). The transmission rate measuring portions 2 measure transmission rates 531 corresponding to the channels on the basis of the quantities 530 of generated information and give the transmission rates 531 to the transmission rate evaluation control portion 3.

The transmission rate evaluation control portion 3 calculates a transmission rate Ra required for real-time transmission of video/audio signals allocated to each channel (channel #1 to channel #n) on the basis of the transmission rates 531 corresponding to the channels (channel #1 to channel #n). Specifically, an arithmetic operation represented by the following expression (1) is carried out so that the sum Ra of transmission rates corresponding to the channels (channel #1 to channel #n) is calculated.

$$Ra = \sum_{k=1}^{n} Rk \qquad \text{Expression (1)}$$

in which Rk represents a transmission rate corresponding to the k-th order channel.

Further, the transmission rate evaluation control portion 3 carries out an arithmetic operation represented by the following expression (2) to calculate a transmission rate difference Rd between the maximum transmission rate Rm in a transmission path between the transmitting portion 110 and the satellite, and the transmission rate Ra given by the aforementioned expression (1).

$$Rd = Rm - Ra \qquad \text{Expression (2)}$$

Incidentally, in the case where the transmission rate Ra is higher than the maximum transmission rate Rm (Rd<0), the transmission rate evaluation control portion 3 supplies control signals 501 to the variable-rate encoders 30 so that the quantities of information generated in the variable-rate encoders 30 are reduced. In this occasion, by means of the control signals 501, the variable-rate encoders 501 may be informed of the same quantities of reduction or may be informed of the quantities of reduction weighted in accordance with the respective transmission rates 531 in the channels (channel #1 to channel #n).

On the other hand, the digital data from the h digital data generators 32 are temporarily stored in the buffers 4 which are provided so as to be allocated to the channels (channel #1 to channel #h). The in-buffer data quantity control portions 6 provided so as to be allocated to the channels (channel #1 to channel #h) monitor the quantities of data stored in the buffers 4 and supply control signals 505 to the digital data generators 32 so that the quantities of data do not exceed the storage capacities of the buffers 4. Further, the quantities 535 of data in the channels (channel #1 to channel #h) are given to the transmission rate evaluation control portion 3 from the in-buffer data quantity control portions 6.

In the case where the transmission rate Ra is not higher than the maximum transmission rate Rm (Rd≧0), the transmission rate evaluation control portion 3 determines transmission rates 543 for the digital data allocated to the channels (channel #1 to channel #h) so that the transmission rates 543 do not exceed the transmission rate Rd calculated by the expression (2). The transmission rate evaluation control portion 3 then informs the data reading control portions 6 which are provided so as to be allocated to the channels (channel #1 to channel #h) of the transmission rates 543. As a method for determining the transmission rates 543, a method of equally dividing the transmission rate Rd by the number h of the channels for digital data may be used or a method of distributing the transmission rate Rd correspondingly to the quantities 535 of data in the channels (channel #1 to channel #h) may be used.

The data reading control portions 6 read digital data from the buffers 4 at the informed transmission rates 534 and store the digital data temporarily.

The switch 7 has a plurality of input terminals corresponding to the buffers 1 and the data reading control portions 5. The switch control mode setting portion 10 sets a mode 507 for identifying channels given coded signals 501 or digital data 504 from variable-rate encoders 30 or digital data generators 32 in the all coded signal and digital data channels (channel #1 to channel #n, channel #1 to channel #h) on the basis of an external input signal 508 and informs the switch control portion 8 of the mode 507. The switch control portion 8 controls the switch 7 so that input terminals corresponding to the channels identified by the mode 507 are selected in order at intervals of a predetermined time. Each of the buffers 1 supplies all coded signals stored therein to the packet generating portion 9 while the buffer 1 is connected to the packet generating portion 9 by the switch 7. Further, each of the data reading control portions supplies all digital data stored therein to the packet generating portion 9 while the data reading control portion is connected to the packet generating portion 9 by the switch 7.

The packet generating portion 9 adds channel identifiers to the data and generates frames for satellite transmission.

In the transmitter shown in FIG. 2, a difference between the total transmission rate of video/audio signals and the maximum transmission rate in the transmission path is calculated so that digital data are transmitted at the residual transmission rate. Accordingly, real-time transmission of video/audio signals and transmission of digital data can be made consistent with each other without reduction in video/audio quality.

Figure 5:
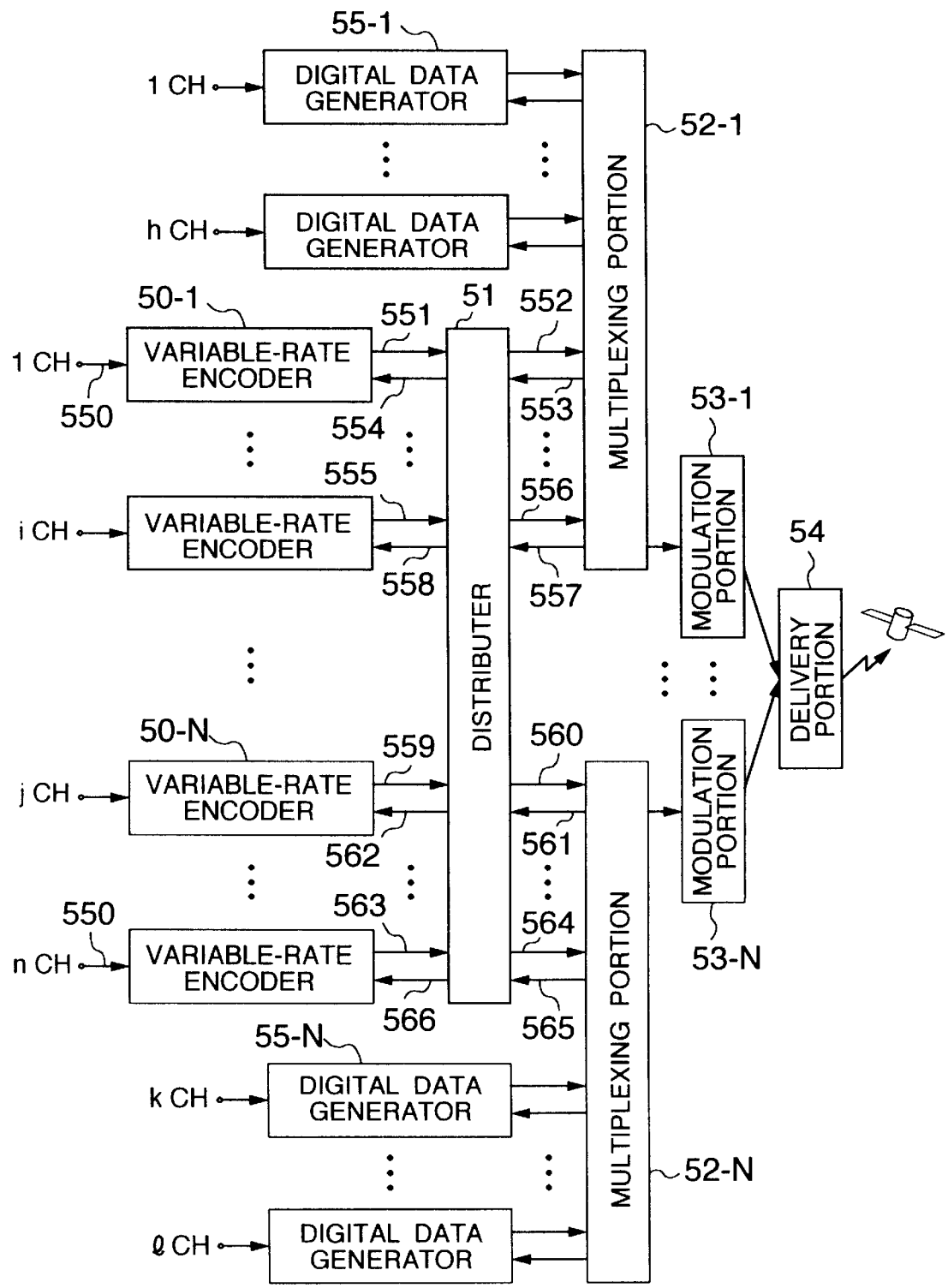
FIG. 5 is a block diagram of a transmitter.

Another example of the transmitter will be described below with reference to the drawings. FIG. 5 is a block diagram of the transmitter. The transmitter shown in FIG. 5 includes N combinations of constituent parts (each combination having a modulation portion, a multiplexing portion, a plurality of digital data generators, and a plurality of variable-rate encoders) shown in FIG. 2 except the delivery portion 34. Modulation portions 53, multiplexing portions 52, digital data generators 55 and variable-rate encoders 50 in the transmitter shown in FIG. 5 carry out the same operations as the modulation portion 33, the multiplexing portion 31, the digital data generators 32 and the variable-rate encoders 30 in the transmitter shown in FIG. 2.

In the transmitter shown in FIG. 5, output signals from the plurality of modulation portions 53-1 to 53-N are digitally modulated in different frequency bands so that the modulation portions 53 and N transmission paths are formed between a delivery portion 54 and a satellite. Further, coded signals 551 and 558 from the variable-rate encoder 50-1 and coded signals 551 and 558 from the variable-rate encoder 50-1 are input to a distributer 51, and control signals 553 and 557 from the multiplexing portion 52-1 and control signals 561 and 565 from the multiplexing portion 52-N are also input to the distributer 51.

In a state (hereinafter referred to as normal state) in which all video/audio signals in channels (#1 to #i) can be real-time transmitted through a transmission path for the output signal of the modulation portion 52-1 and all video/audio signals in channels (#j to #n) can be real-time transmitted through a transmission path for the output signal of the modulation portion 52-1, the coded signals 551 and 558 from the variable-rate encoder 50-1 are input to the multiplexing portion 52-1 through signal lines 552 and 556 and the coded signals 559 and 563 from the variable-rate encoder 50-N are input to the multiplexing portion 52-N through signal lines 560 and 564. If not in the ordinary state, the distributer 51 changes distribution of the plurality of input coded signals 551, 555, 559 and 563 to the plurality of multiplexing portions 52-1 to 52-N in order to exchange coded signals of several channels on transmission paths with no margin in terms of transmission rate to new coded signals of several channels on transmission paths having enough margin.

Figure 6:
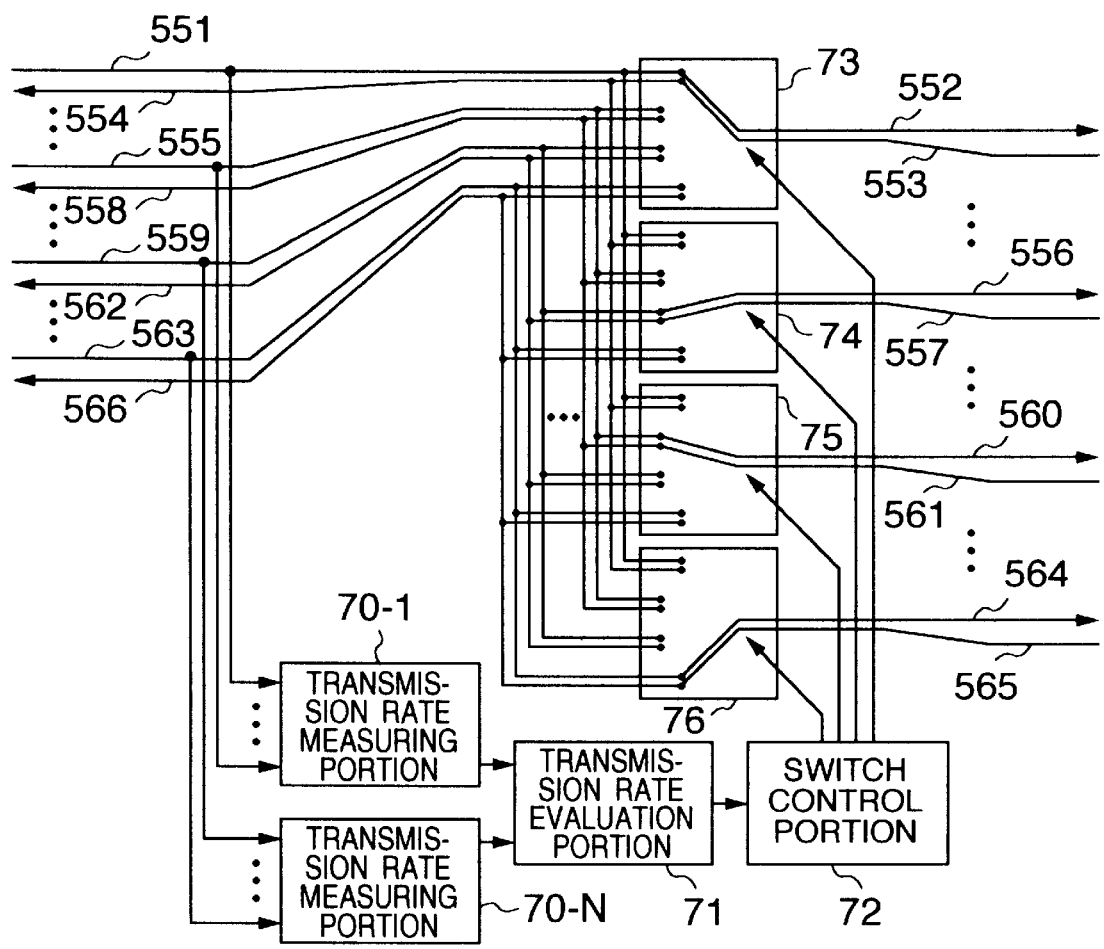
FIG. 6 is a block diagram of a distributer.
Figure 7:
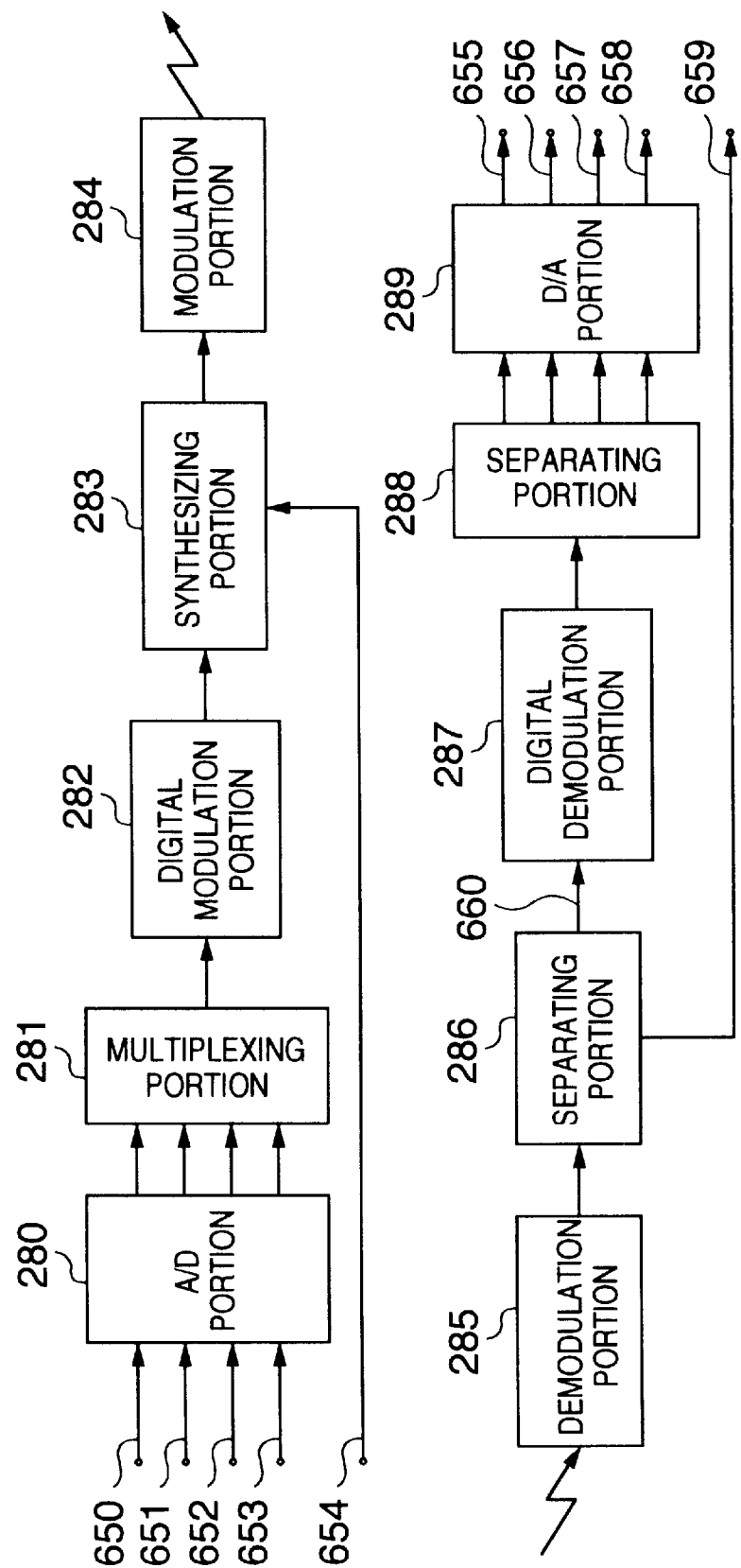
FIG. 7 is a block diagram of an audio signal transmission system in satellite broadcasting.

FIG. 6 is a block diagram of the distributer 51.

The distributer 51 has switches 73, 74, 75 and 76 of the same number as the number of the variable-rate encoders 50, transmission rate measuring portions 70-1 to 70-N of the same number as the number of the multiplexing portions 52-1 to 52-N (or the modulation portions 53-1 to 53-N), a transmission rate evaluation control portion 71, and a switch control portion 72. Each of the switches 73, 74, 75 and 76 has a plurality of connection terminals connected to the variable-rate encoders 50. Further, a plurality of coded signals which are transmitted simultaneously on one transmission path in an ordinary state are input to each of the transmission rate measuring portions 70-1 to 70-N.

Each of the transmission rate measuring portions 70-1 to 70-N measures transmission rates in the input coded signals and calculates the sum of the transmission rates. The transmission rate evaluation control portion 71 is informed of the sum of the transmission rates. The transmission rate evaluation control portion 71 calculates a difference between the maximum transmission rate and the informed sum of the transmission rates to thereby discriminate between the transmission path in which the sum of the transmission rates reaches the maximum transmission rate and the transmission path in which the sum of the transmission rates does not reach the maximum transmission rate. The transmission rate evaluation control portion 71 determines distribution of the plurality of input coded signals 551, 555, 559 and 563 to the plurality of multiplexing portions 52-1 to 52-N on the basis of the calculated difference and the informed respective transmission rates so that all coded signals can be transmitted in real time. The transmission rate evaluation control portion 71 then gives the switch control portion 72 a control signal for specifying a switch to be changed over and a connection terminal to be connected. The switch control portion 72 performs switching control of the switches 73, 74, 75 and 76 on the basis of the control signal from.

FIG. 6 shows an extraordinary state in which the switches 74 and 75 are controlled to be switched over so that a coded signal 559 from the j-channel variable-rate encoder 50-N is input to the multiplexing portion 52-1 through the signal line 556 and a coded signal 555 from the i-channel variable-rate encoder 50-1 is input to the multiplexing portion 52-N through the signal line 560.

In the transmitter shown in FIG. 6, respective maximum transmission rates in a plurality of transmission paths can be used effectively so that all video/audio signals can be transmitted in real time without reduction in video/audio quality.

What is claimed is:

1. A digital data transmission system for multiplexing a plurality of video/audio signals and a plurality of digital data and transmitting the multiplexed signal on one transmission path, comprising a transmitter, and a receiver, wherein:

said transmitter includes a plurality of variable-rate encoders for encoding video/audio signals at variable rates and outputting coded signals respectively, a plurality of digital data generators for outputting a plurality of digital data respectively, a multiplexing portion for multiplexing the plurality of coded signals from said variable-rate encoders and the plurality of digital data from said digital data generators and outputting a multiplexed signal, a modulation portion for digitally modulating the multiplexed signal from said multiplexing portion and outputting a modulated signal, and a delivery portion for delivering the modulated signal from said modulation portion to said transmission path;

said receiver includes a receiving portion for receiving the modulated signal through said transmission path, a demodulation portion for demodulating the received modulated signal and outputting a demodulated signal, a separating portion for separating the demodulated signal of said demodulation portion into a plurality of coded signals and a plurality of digital data, and a plurality of decoders for decoding the separated coded signals;

said multiplexing portion includes a plurality of transmission rate measuring portions for measuring transmission rates of the coded signals and outputting measurement results, and a transmission rate evaluation control portion for calculating the sum of the transmission rates of the coded signals on the basis of the measurement results from said transmission rate measuring portions and comparing the sum of the transmission rates with a maximum transmission rate of said transmission path; and when the comparison result in said transmission rate evaluation control portion indicates that the maximum transmission rate is higher than the sum of the transmission rates, said multiplexing portion multiplexes the digital data and the coded signals.

2. A digital transmission system according to claim 1, wherein said transmission rate evaluation control portion calculates a residual transmission rate obtained by subtracting the respective transmission rates of the coded signals from the maximum transmission rate and determines transmission rates for the respective digital data so that the transmission rates for the respective digital data do not exceed the residual transmission rate.

3. A digital transmission system according to claim 2, wherein:

said multiplexing portion further includes a plurality of buffers for temporarily storing the digital data from said digital data generators, and a plurality of in-buffer data quantity control portions for measuring quantities of data remaining in said buffers respectively and informing said transmission rate evaluation control portion of measurement results; and said transmission rate evaluation control portion distributes the residual transmission rate to the digital data correspondingly to the quantities of data remaining in said buffers respectively.

4. A transmitter for multiplexing a plurality of video/audio signals and a plurality of digital data and delivering a multiplexed signal to a transmission path, comprising a plurality of variable-rate encoders for encoding video/audio signals at variable rates and outputting coded signals respectively, a plurality of digital data generators for outputting a plurality of digital data respectively, a multiplexing portion for multiplexing the plurality of coded signals from said variable-rate encoders and the plurality of digital data from said digital data generators and outputting a multiplexed signal, a modulation portion for digitally modulating the multiplexed signal from said multiplexing portion and outputting a modulated signal, and a delivery portion for delivering the modulated signal from said modulation portion to said transmission path, wherein:

said multiplexing portion includes a plurality of transmission rate measuring portions for measuring transmission rates of the coded signals and outputting measurement results, and a transmission rate evaluation control portion for calculating the sum of the transmission rates of the coded signals on the basis of the measurement results from said transmission rate measuring portions and comparing the sum of the transmission rates with a maximum transmission rate of said transmission path; and when the comparison result in said transmission rate evaluation control portion indicates that the maximum transmission rate is higher than the sum of the transmission rates, said multiplexing portion multiplexes the digital data and the coded signals.

5. A transmitter according to claim 4, wherein said transmission rate evaluation control portion calculates a residual transmission rate obtained by subtracting the respective transmission rates of the coded signals from the maximum transmission rate and determines transmission rates for the respective digital data so that the transmission rates for the respective digital data do not exceed the residual transmission rate.

6. A transmitter according to claim 5, wherein:

said multiplexing portion further includes a plurality of buffers for temporarily storing the digital data from said digital data generators, and a plurality of in-buffer data quantity control portions for measuring quantities of data remaining in said buffers respectively and informing said transmission rate evaluation control portion of measurement results; and said transmission rate evaluation control portion distribute the residual transmission rate to the digital data correspondingly to the quantities of data remaining in said buffers respectively.

7. A transmitter for multiplexing a plurality of video/audio signals and a plurality of digital data and delivering a multiplexed signal to a transmission path, comprising a plurality of variable-rate encoders for encoding video/audio signals at variable rates and outputting coded signals respectively, a plurality of digital data generators for outputting a plurality of digital data respectively, a multiplexing portion for multiplexing the plurality of coded signals from said variable-rate encoders and the plurality of digital data from said digital data generators and outputting a multiplexed signal, a modulation portion for digitally modulating the multiplexed signal from said multiplexing portion and outputting a modulated signal, and a delivery portion for delivering the modulated signal from said modulation portion to said transmission path, wherein said multiplexing portion measures transmission rates of the coded signals, calculates the sum of the transmission rates of the coded signals and compares the sum of the transmission rates with a maximum transmission rate of said transmission path so that, when the maximum transmission rate is higher than the sum of the transmission rates, said multiplexing portion multiplexes the digital data and the coded signals.

8. A transmitter according to claim 7, wherein said transmission rate evaluation control portion calculates a residual transmission rate obtained by subtracting the respective transmission rates of the coded signals from the maximum transmission rate and determines transmission rates of the respective digital data so that the transmission rates for the respective digital data do not exceed the residual transmission rate.

9. A transmitter for multiplexing a plurality of video/audio signals and a plurality of digital data and delivering a multiplexed signal to a transmission path, comprising a multiplexing portion for multiplexing a plurality of coded signals obtained by variable-rate encoding the video/audio signals and a plurality of digital data and outputting a multiplexed signal, a modulation portion for digitally modulating the multiplexed signal from said multiplexing portion and outputting a modulated signal, and a delivery portion for delivering the modulated signal from said modulation portion to said transmission path, wherein:

said multiplexing portion includes a plurality of transmission rate measuring portions for measuring transmission rates of the coded signals and outputting measurement results, and a transmission rate evaluation control portion for calculating the sum of the transmission rates of the coded signals on the basis of the measurement results from said transmission rate measuring portions and comparing the sum of the transmission rates with a maximum transmission rate of said transmission path; and when the comparison result in said transmission rate evaluation control portion indicates that the maximum transmission rate is higher than the sum of the transmission rates, said multiplexing portion multiplexes the digital data and the coded signals.

10. A transmitter according to claim 9, wherein said transmission rate evaluation control portion calculates a residual transmission rate obtained by subtracting the respective transmission rates of the coded signals from the maximum transmission rate and determines transmission rates for the respective digital data so that the transmission rates for the respective digital data do not exceed the residual transmission rate.

11. A transmitter according to claim 10, wherein:

said multiplexing portion further includes a plurality of buffers for temporarily storing the digital data from said digital data generators, and a plurality of in-buffer data quantity control portions for measuring quantities of data remaining in said buffers respectively and informing said transmission rate evaluation control portion of measurement results; and said transmission rate evaluation control portion distribute the residual transmission rate to the digital data correspondingly to the quantities of data remaining in said buffers respectively.

12. A transmitter for multiplexing a plurality of video/audio signals and a plurality of digital data and delivering a multiplexed signal to a transmission path, comprising a multiplexing portion for multiplexing a plurality of coded signals obtained by variable-rate encoding the video/audio signals and a plurality of digital data and outputting a multiplexed signal, a modulation portion for digitally modulating the multiplexed signal from said multiplexing portion and outputting a modulated signal, and a delivery portion for delivering the modulated signal from said modulation portion to said transmission path, wherein:

said multiplexing portion measures transmission rates of the coded signals, calculates the sum of the transmission rates of the coded signals and compares the sum of the transmission rates with a maximum transmission rate of said transmission path so that, when the maximum transmission rate is higher than the sum of the transmission rates, said multiplexing portion multiplexes the digital data and the coded signals.

13. A transmitter according to claim 12, wherein said transmission rate evaluation control portion calculates a residual transmission rate obtained by subtracting the respective transmission rates of the coded signals from the maximum transmission rate and determines transmission rates for the respective digital data so that the transmission rates for the respective digital data do not exceed the residual transmission rate.

14. A transmitter for transmitting a plurality of multiplexed signals, each containing a plurality of video/audio signals and a plurality of digital data, to different transmission paths, comprising a plurality of variable-rate encoders for encoding video/audio signals at variable rates and outputting coded signals respectively, a plurality of digital data generators for outputting a plurality of digital data respectively, a plurality of multiplexing portions for multiplexing the plurality of coded signals and the plurality of digital data from said digital data generators and outputting multiplexed signals respectively, a distributer for receiving all the coded signals as input signals from said plurality of variable-rate encoders and distributing the multiplexed signals to said plurality of multiplexing portions, a plurality of modulation portions for digitally modulating the multiplexed signals from said multiplexing portions and outputting modulated signals respectively, and a delivery portion for delivering the modulated signals from said modulation portions to said different transmission paths respectively, wherein:

said distributer includes a plurality of transmission rate measuring portions for measuring transmission rates of the coded signals and outputting measurement results, and a transmission rate evaluation control portion for determining distribution of the plurality of input multiplexed signals to said plurality of multiplexing portions on the basis of the measurement results from said transmission rate measuring portions and the maximum transmission rates of said transmission paths.

* * * * *